US009662750B2

(12) United States Patent
Williams et al.

(10) Patent No.: US 9,662,750 B2
(45) Date of Patent: May 30, 2017

(54) SYSTEM AND APPARATUS FOR ENSURING A LEVEL CUT OF A PIPE

(71) Applicant: Zircon Developments Inc., Rocky Mountain House (CA)

(72) Inventors: Randy Williams, Rocky Mountain House (CA); Frank Williams, Rocky Mountain House (CA)

(*) Notice: Subject to any disclaimer, the term of this patent is extended or adjusted under 35 U.S.C. 154(b) by 353 days.

(21) Appl. No.: 14/038,744

(22) Filed: Sep. 26, 2013

(65) Prior Publication Data

US 2015/0084247 A1    Mar. 26, 2015

(51) Int. Cl.
*B23K 7/10* (2006.01)
*B23K 7/00* (2006.01)
*B23K 37/02* (2006.01)

(52) U.S. Cl.
CPC ........ *B23K 37/0217* (2013.01); *B23K 37/027* (2013.01); *B23K 37/0276* (2013.01)

(58) Field of Classification Search
CPC ........ B23K 7/006; B23K 7/007; B23K 7/102; B23K 7/10
USPC ................... 266/54, 67, 56, 66, 73
See application file for complete search history.

(56) References Cited

U.S. PATENT DOCUMENTS

| 1,852,412 A | * | 4/1932 | Hickey | B23K 7/006 266/56 |
| 2,807,921 A | | 10/1957 | Dewing et al. | |
| 4,185,525 A | | 1/1980 | Sherer | |
| 4,331,278 A | | 5/1982 | Sherer | |
| 4,646,841 A | * | 3/1987 | Schawann | E21B 19/004 166/355 |

* cited by examiner

*Primary Examiner* — Scott Kastler
*Assistant Examiner* — Michael Aboagye
(74) *Attorney, Agent, or Firm* — Sander R. Gelsing

(57) ABSTRACT

In one embodiment, an apparatus for attachment to a pipe cutter having a saddle portion is disclosed comprising a first member suitable for mounting to the saddle portion, a second member suitable for mounting to a pipe and a pivoting joint to pivotally connect first member to second member. In another embodiment, an apparatus for attachment to a pipe cutter having a saddle portion is disclosed comprising a first member suitable for mounting to the saddle portion, a second member suitable for mounting to a pipe, a pivoting joint to pivotally connect first member to second member, pipe mounting means to securely mount second member to said pipe, angle adjustment means and at least one fastener to securely fasten first member to the saddle portion of the pipe cutter.

3 Claims, 7 Drawing Sheets

SYSTEM AND APPARATUS FOR ENSURING A LEVEL CUT OF A PIPE

FIELD OF THE INVENTION

The present invention relates generally to pipe or pile cutting apparatus and, more particularly, to adjusting means and apparatus to ensure a level cut or bevel of a pipe that is driven into the ground at an angle offset from the vertical plane.

BACKGROUND OF THE INVENTION

The background information discussed below is presented to better illustrate the novelty and usefulness of the present invention. Except where indicated, this background information is not admitted prior art.

Piles, piling or screwpiles are a steel screw-in pipes and ground anchoring systems used for building foundations, bridge foundations, piers, pipeline tie-downs and in other applications. They are often necessary for foundations where the ground is not compacted, strong enough, or of variable capacity to carry a building structure, i.e. the pile's shaft transfers a structure's load deep into the ground. Subsequent foundation members, such as horizontal beams, are typically welded or otherwise attached to a plurality of such screwed-in piles, i.e. to that portion of the pile shafts' which stick up above the ground. For a number of reasons (including, change in localized ground conditions or ground slope), adjacent piles are often driven into the ground at different depths, i.e. with different above-ground portions then extending above the ground at different heights, relative to the horizontal plane. A pipe or pile cutter is then employed to cut the plurality of piles to the desired vertical elevation above-ground. Typically, a portable saddle-type pipe cutter (also called a pipe beveller) having a cutting torch is utilized to that effect.

Figure 1A:
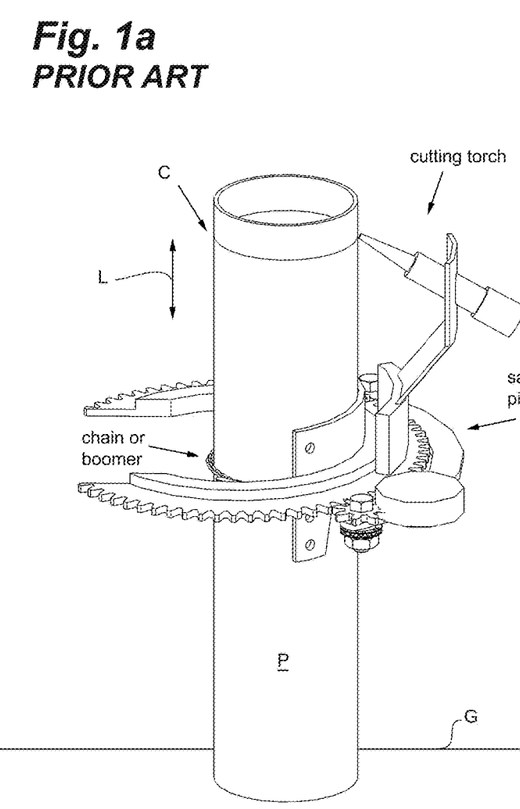
FIGS. 1a-1b are a perspective view and a side view of a PRIOR ART saddle-type pipe cutter shown mounted on a pipe that is placed in the ground substantially along the vertical plane.
Figure 1B:
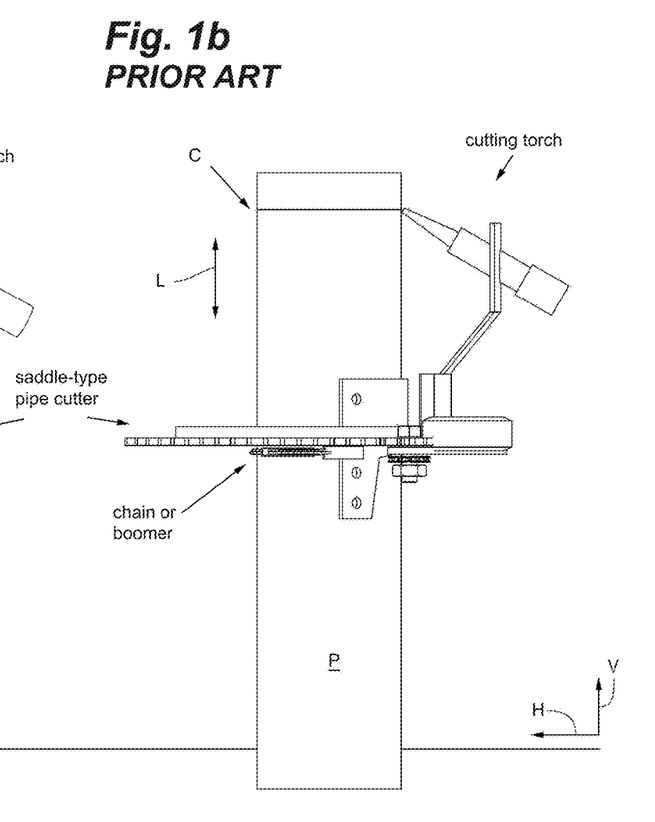

Saddle-type pipe cutters are well known in the art. FIGS. 1a-1b illustrate a prior art saddle-type pipe cutter mounted in a conventional manner, such as via a chain or boomer, around a section of pipe P that is extending above the ground G along the vertical plane V. Conventionally, such a pipe cutter will cause the cutting torch to rotate around the pipe and make a cut C which is generally along a plane that is perpendicular to the pipe's longitudinal axis L. If the pipe P is screwed or placed into the ground substantially along the vertical plane V, then any such cut C will be substantially parallel to the horizontal plane H and the top of the pipe will therefore be substantially level.

Figure 1C:
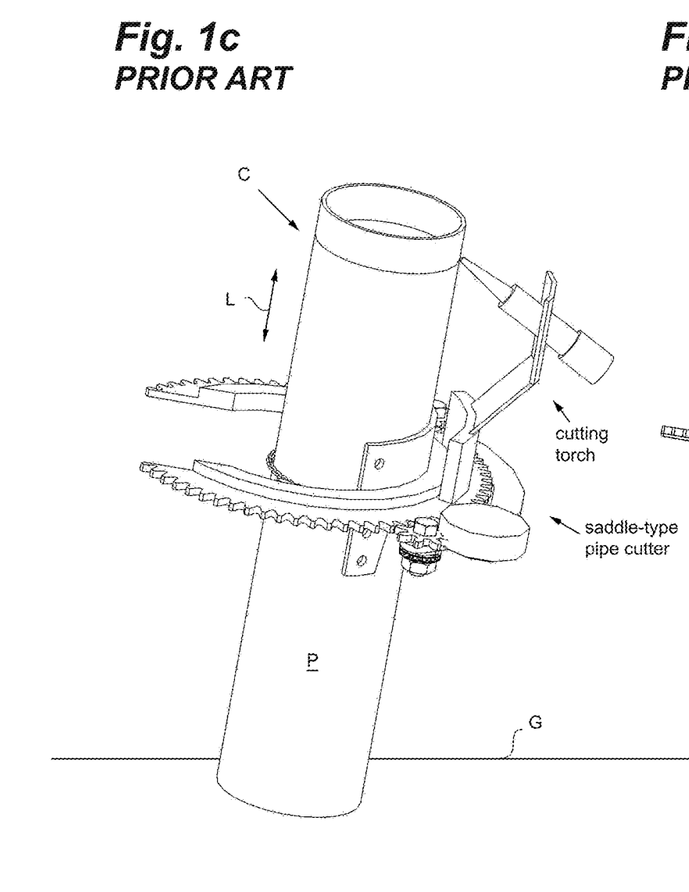
FIGS. 1c-1d are a perspective view and a side view of a PRIOR ART saddle-type pipe cutter shown mounted on a pipe that is placed in the ground at an offset angle to the vertical plane.
Figure 1D:
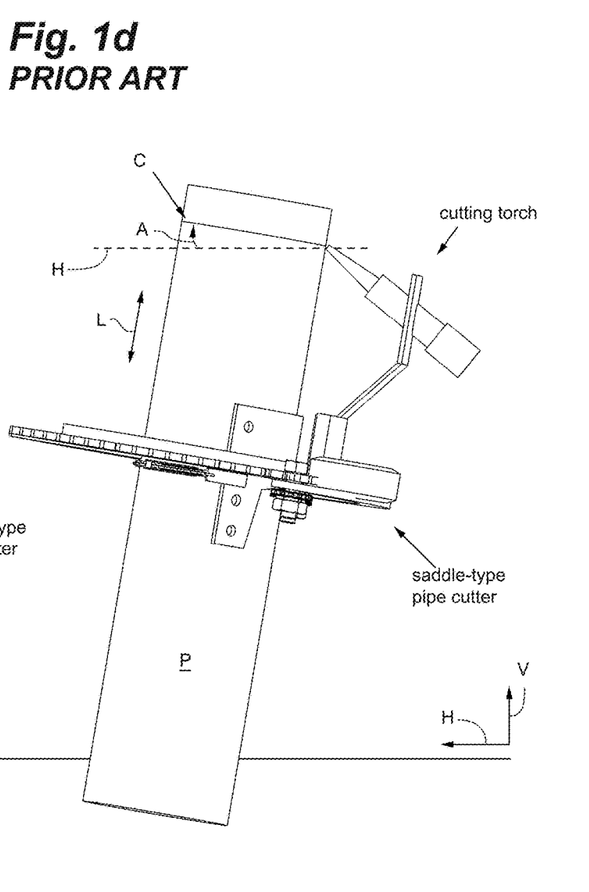

However, often such piling or pipe P is not placed into the ground G in a substantially vertical manner. Instead, and as illustrated in FIGS. 1c-1d, pipe P may be installed into the ground offset to some degree from the vertical plane V. In such a case, where the longitudinal axis L of a pipe P is offset from the vertical plane V, conventional saddle-type pipe cutters will cause the cutting torch to create a cut C that is also offset by a similar amount or angle A from the horizontal plane H; and the top of the pipe P is then no longer level (see FIG. 1D). This is not desirable, since it complicates subsequent attachment and mounting of any general horizontal structures or beams to such offset pilings.

Therefore, what is needed is a method and apparatus to easily allow a saddle-type pipe cutter to make generally level cuts on pipe and/or piling that is placed into the ground at angles that are offset from the vertical plane.

SUMMARY OF THE INVENTION

In one embodiment of the disclosed technology, an apparatus for attachment to a pipe cutter having a saddle portion is disclosed comprising a first member suitable for mounting to the saddle portion, a second member suitable for mounting to a pipe and a pivoting joint to pivotally connect first member to second member.

In another embodiment of the disclosed technology, a pipe cutter having a saddle assembly is disclosed comprising a pivoting joint, a member suitable to mount the pipe cutter to a pipe, said member pivotally mounted to the saddle assembly via said pivoting joint and pipe mounting means to removably mount said member to a pipe.

In yet another embodiment of the disclosed technology, an apparatus for attachment to a pipe cutter having a saddle portion is disclosed comprising a first member suitable for mounting to the saddle portion, a second member suitable for mounting to a pipe, a pivoting joint to pivotally connect first member to second member, pipe mounting means to securely mount second member to said pipe, angle adjustment means and at least one fastener to securely fasten first member to the saddle portion of the pipe cutter.

BRIEF DESCRIPTION OF THE DRAWINGS

Referring to the drawings, several aspects of the present invention are illustrated by way of example, and not by way of limitation, in detail in the figures, wherein:

FIGS. 3a-3e are front, side, rear, top and bottom perspective views of the embodiment of FIG. 2a;

DETAILED DESCRIPTION OF THE PREFERRED EMBODIMENTS

The following description is of a preferred embodiment by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

Figure 2A:
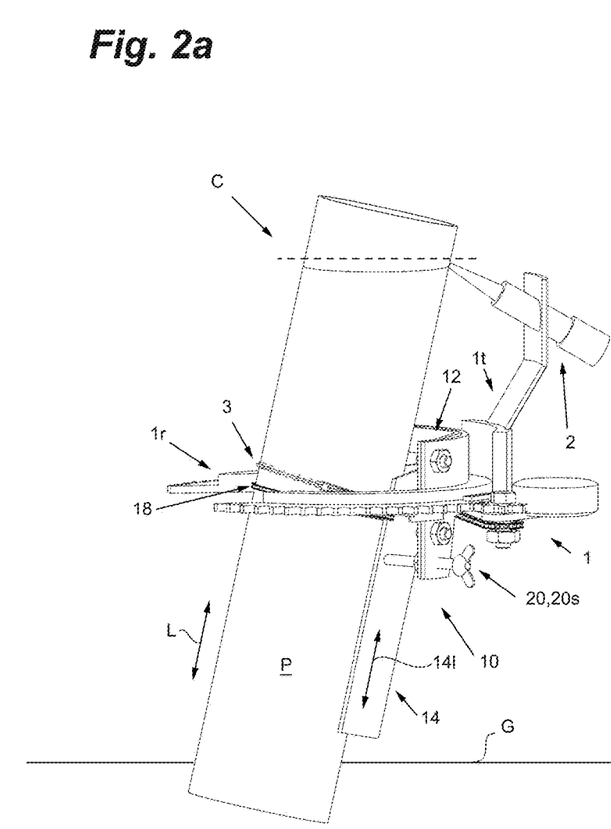
FIGS. 2a-2b are a perspective view and a side view of one embodiment of the invention, shown mounted between a saddle-type pipe cutter and a pipe that is placed in the ground at an offset angle to the vertical plane.
Figure 2B:
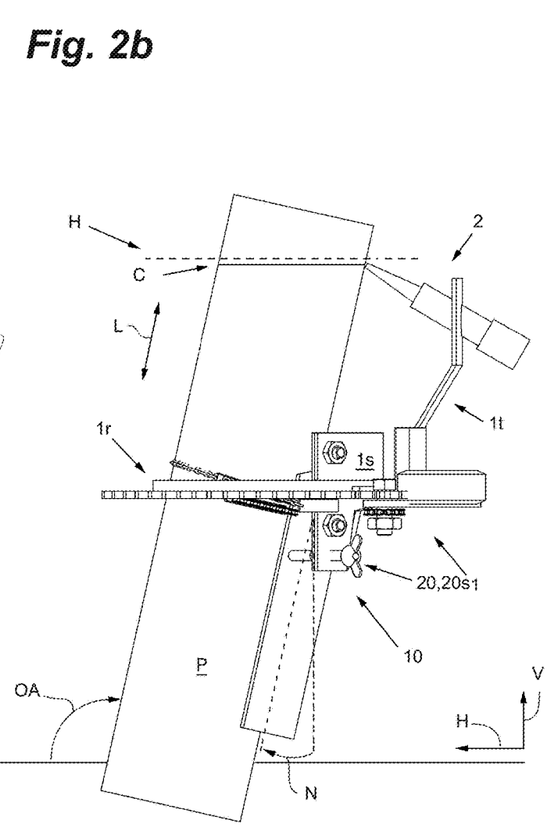

In accordance with a preferred embodiment of the present invention and as shown generally in FIGS. 2a-4b, there is a provided an apparatus 10 for attachment M to a saddle-type pipe cutter or beveller 1 having a cutting torch 2 to allow an operator thereof to use said cutter 1 and torch 2 to easily create level cuts C (i.e. a cut which is substantially parallel to the horizontal plane H) on the top of said pipe; including on pipes P that are placed in the ground G at an offset angle OA to the vertical plane V (for example, see FIGS. 2a-2b). As is conventional, the pipe cutter 1 comprises a saddle assembly or portion 1s and a chain or boomer 3 for mounting the cutter 1 to the pipe P, a torch arm 1t for mounting the torch 2 to the cutter 1, and a ring gear assembly 1r for rotating the torch arm 1t and torch 2 around the pipe P to affect a cut C.

The apparatus 10 comprises a first section or member 12 suitable for mounting M the apparatus 10 to a saddle-type pipe cutter or beveller 1 and a second section or member 14 suitable to mount the apparatus 10 against or adjacent to pipe or piling P. Preferably, first section 12 is in the form of a generally U-shaped elongate member having a base 12a with lateral sides 12l depending therefrom, wherein first section 12 substantially follows the relevant contours of the interior of the saddle portion 1s of the pipe cutter 1, so as to allow for ease of mounting M of the first section 12 to the saddle portion 1s (e.g. see FIG. 4a). Fasteners 15, such as nuts and bolts, are preferably provided to securely fasten first section 12 to the saddle portion 1s of the pipe cutter 1. In another embodiment (not shown), first section 12 is more permanently mounted to a pipe cutter 1, such as via welding. Preferably, second section 14 is in the form of an elongate member having a longitudinal axis 14l, such as a length of angle iron. In another embodiment (not shown), second section 14 is in the form of a member having a semi-circular cross-sectional shape, the radius thereof being slightly larger than the radius of the pipe P, so as to allow mounting of the second section 14 around the outside of said pipe P.

A pivoting joint 16 is provided to pivotally connect or mount first section 12 to second section 14 and allow first section 12 and second section 14 to be pivotally spaced or adjusted relative to each other. Preferably, first section 12 is an elongated member having a first end 12t (e.g. end on the base 12a) and a generally opposite second end(s) 12b (e.g. end(s) of the lateral sides 12l), second section 14 is also an elongated member having a first end 14t and a generally opposite second end 14b along longitudinal axis 14l, and pivoting joint 16 pivotally connects first end 12t of first section 12 to the first end 14t of second section 14. Pivot 16 thereby forms a vertex and allows first and second sections 12, 14 to act as rays or sides of an angle N that is then created therebetween (e.g. see FIGS. 3f and 3g). Angle N is therefore adjustable by an operator, i.e. depending on how much first section 12 is pivoted along pivot 16 relative to second section 14 (e.g. compare FIG. 3f to FIG. 3g).

Figure 4A:
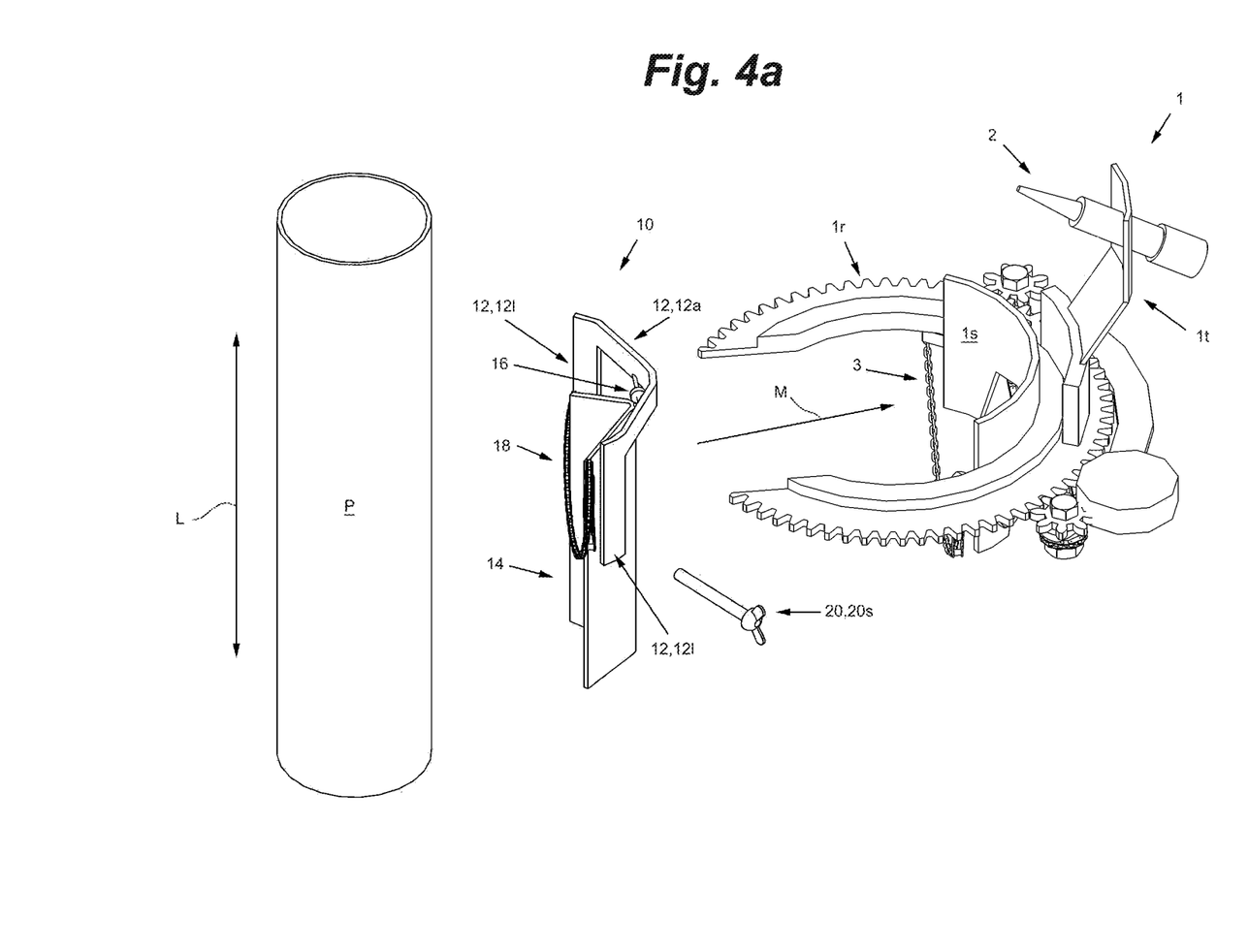
FIG. 4a is a side perspective view of the embodiment of FIG. 2a, shown adjacent to a saddle-type cutter and ready for mounting thereto.
Figure 4B:
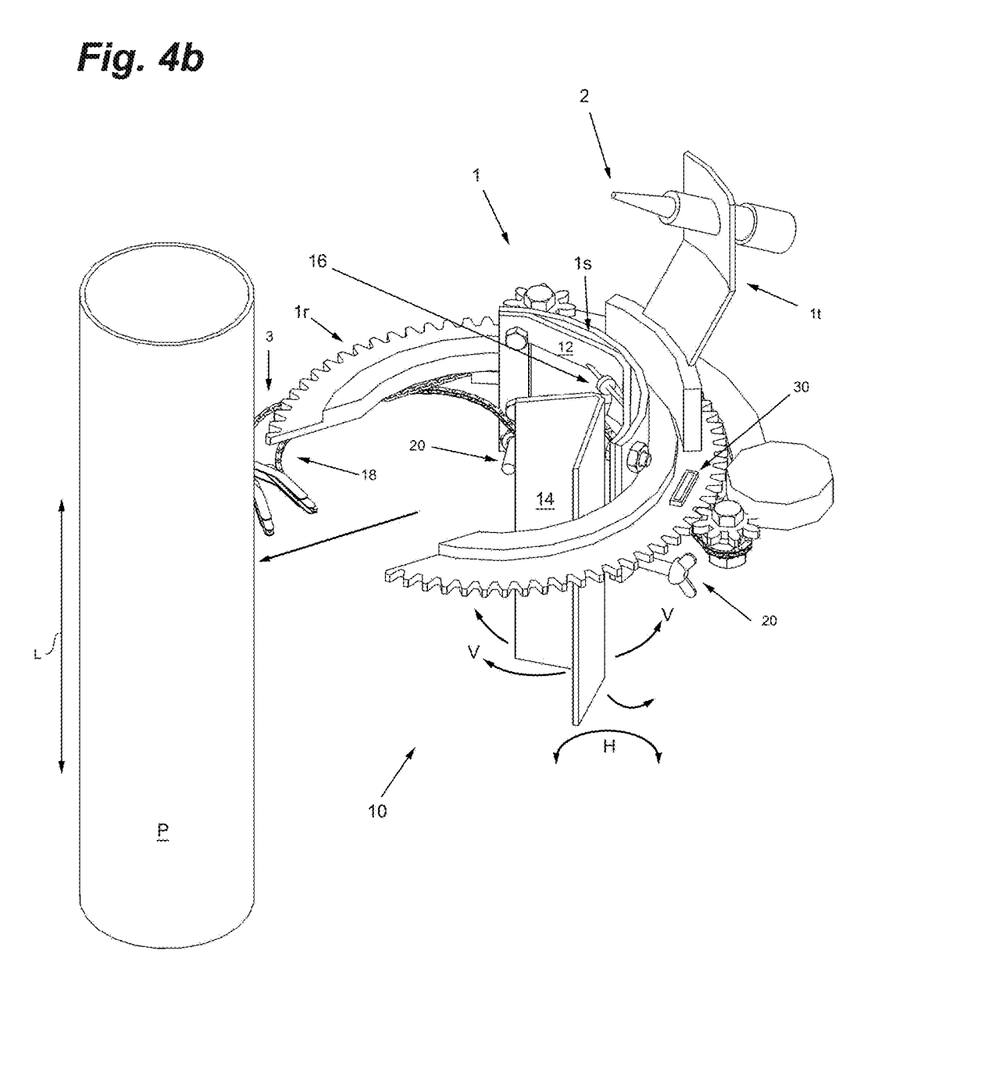
FIG. 4b is a side perspective view of the embodiment of FIG. 2a mounted to a saddle-type cutter, shown ready for mounting to a pipe.

Accordingly, once the first section 12 of the apparatus 10 is mounted M to the saddle portion 1s of a pipe cutter 1, pipe cutter 1 can likewise be pivotally spaced or angularly adjusted relative to the second section 14 (e.g. see FIG. 4b and note how second section 14 can pivotally move as illustrated by arrow lines H and V). In another embodiment (not shown) first section 12 is integral with, or part of, the saddle portion 1s and therefore second section 14 pivotally connects directly to saddle portion 1s via pivoting joint 16. Pivoting joint 16 may be a hinge joint, allowing only pivoting motion of the first section 12 relative to the second section 14 in one plane; e.g. only in the vertical plane V. Preferably, however, pivoting joint 16 is a ball-and-socket joint capable of motion around an indefinite number of axes, thereby allowing pivoting of the first section 12 relative to the second section 14 along both the vertical plane V and the horizontal plane H (see, for example, FIG. 4b).

Preferably, pipe mounting means 18, such as a chain or boomer, is provided to securely and removably mount second section 14 to a section of pipe P, preferably with the longitudinal axis of second section 14l being substantially aligned parallel to the longitudinal axis of the pipe L (e.g. see FIG. 2a). Once second section 14 is securely mounted to a pipe P, and assuming that the first section 12 of the apparatus 10 is mounted M to the saddle portion 1s, pipe cutter 1 can then be pivotally spaced or angularly adjusted relative to the pipe P at substantially the same angle N as is adjustable between first and second sections 12, 14, as discussed above (e.g. see FIG. 2b).

Advantageously, an operator can angularly adjust angle N of the pipe cutter 1 (and hence also the ring gear assembly 1r, the torch arm 1t and torch 2) relative to the pipe P, so as to now rotate around the pipe P and affect a substantially level cut C which is substantially parallel to the horizontal plane H; e.g. see FIG. 2b. For example, where the offset angle OA between the pipe P and the ground G is obtuse, the first ends 12t, 14t of the first and second sections 12, 14, the pivot 16, the torch arm 1t and the torch 2 are all preferably positioned closer to the top of the pipe P during cutting operations (see FIGS. 2a and 2b), so that the vertex of angle N is at generally the top above the ground G and angle N is adjusted to be acute so as to counteract offset angle OA (see FIG. 2b). In another embodiment (not shown), first ends 12t, 14t and pivot 16 are positioned closer to the bottom of the pipe P and the ground G, while torch arm it and torch 2 are positioned closer to the top of the pipe P. Such embodiment of the invention 10 is then suitable for pipe P that has an acute offset angle OA. However, given that an operator will generally have access to all sides of the pipe P, and that for the side that has an acute offset angle OA, the generally opposite side of the pipe will have an obtuse offset angle OA, the embodiment of the invention 10 as shown in FIGS. 2a-4b should generally work with any offset pipe P as long as it and the pipe cutter 1 are placed at the appropriate side of the pipe P to counteract the offset angle OA.

Preferably, angle adjustment means 20 are provided to selectively adjust, and then maintain (preferably, along with the force of gravity and the pipe mounting means 18) a desired angle N between first 12 and second 14 sections and, hence, also, between pipe cutter 1 and pipe P. Preferably, angle adjustment means 20 comprise one or more adjustment screws 20s that are threadably passed through a portion of the saddle assembly 1s and/or the first section 12 to engage with either the second section 14 or the pipe P at a desired spacing to maintain angle N (e.g. see FIG. 2a). In the preferred embodiment, two adjustment screws 20s are provided, one on either side of the saddle assembly 1s at the ends of the lateral sides 12l (e.g. see FIG. 3c).

Figures 3A, 3B, 3C, 3D, 3E:
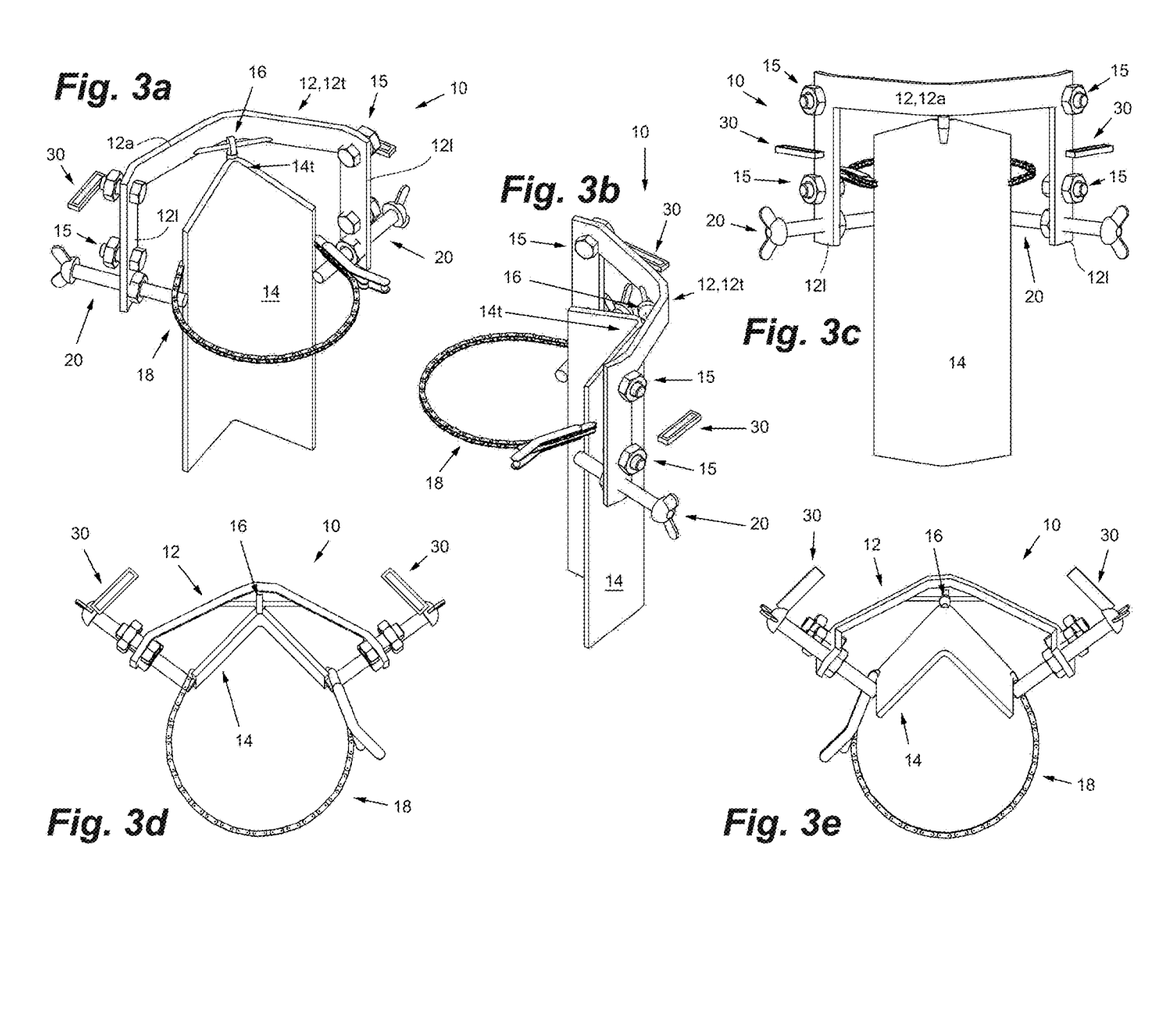
Figures 3F, 3G:
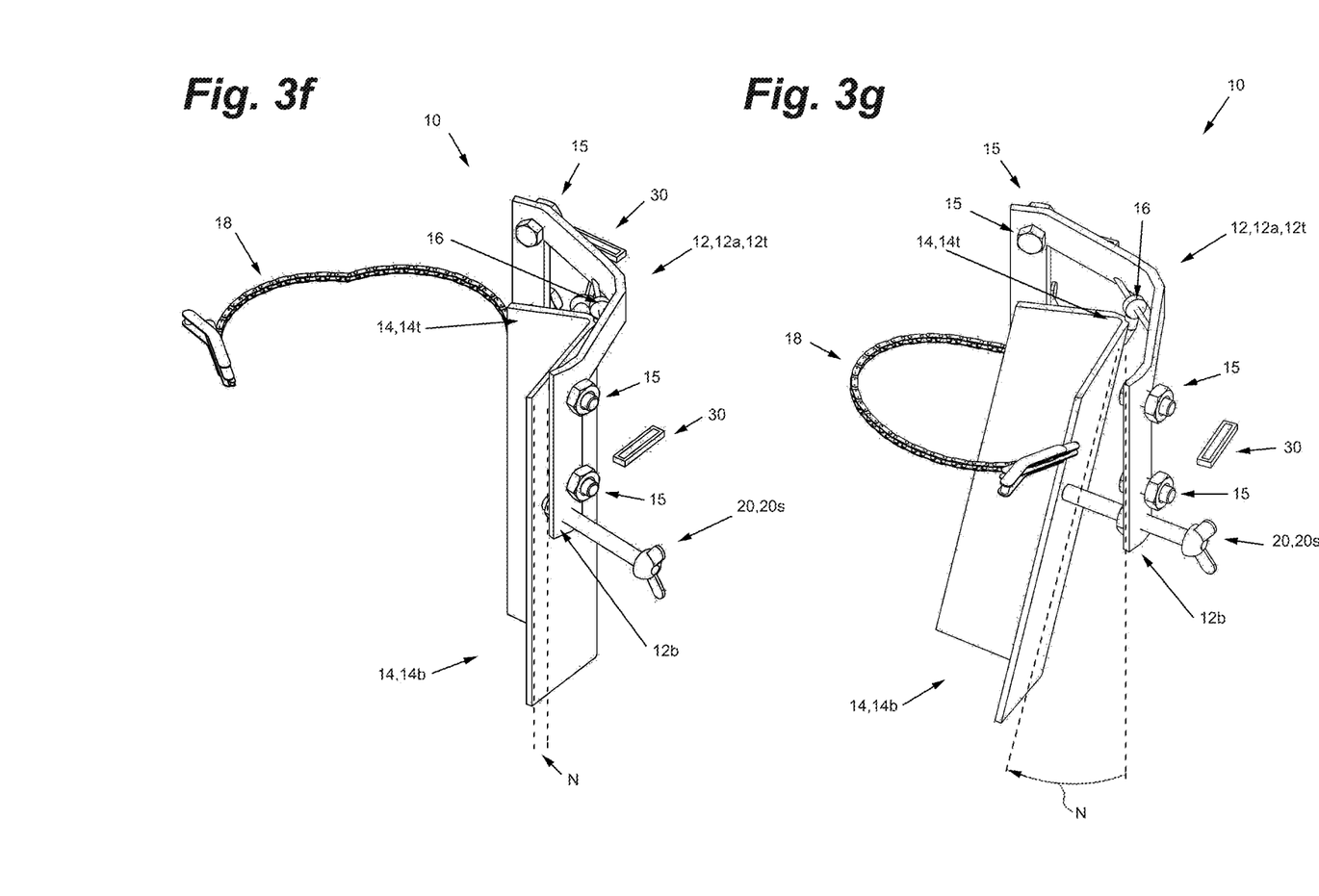
FIGS. 3f-3g are side perspective views of the embodiment of FIG. 2a, illustrating pivotal movement of the first section relative to the second section.

Advantageously, once an operator has selected the desired angle N to affect a substantially level cut C with torch 2, angle adjustment means 20 are actuated or utilized (or rotated in the case of adjustment screws 20s) to maintain desired angle N against the forces of gravity and/or the pipe mounting means 18 during cutting operations. Compare, for example, the amount of adjustment screw 20s placement through lateral side 12l as shown in FIG. 3f with that shown in FIG. 3g and the corresponding difference in angle N.

More preferably, boomer strap 3 may also be utilized along with pipe mounting means 18 to securely fasten the entire assembly of pipe cutter 1 and invention 10 to the pipe P. More advantageously, if an operator desires to make a small adjustment to the angle N, then either one or both of boomer strap 3 and/or pipe mounting means 18 can be loosened or unfastened while the exact positioning of the screws 20s are adjusted. Even more preferably, one or more small spirit or bubble levels 30 are provided to be positionable on the ring gear assembly 1r so as to assist an operator to determine whether the ring gear assembly 1*r* is level with the horizontal plane H (e.g. see FIG. 4*b*). Advantageously, and in the case of most conventional pipe cutters 1, if the ring gear assembly 1*r* is level with the horizontal plane H, then any cut made by the torch 2 will likewise be level with the horizontal plane H.

Unless otherwise specified, it is preferred that the components of the invention 10 be made of steel or other suitable high-strength materials capable of taking stresses and strains during its intended use during pipe cutting operations. Further, in accordance with normal practice, it is preferred that the tolerances between the parts are selected to prevent binding, to allow the desired pivotal movement and to permit easy assembly and disassembly of the invention 10 to and from a pipe cutter 1.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The embodiments of the invention in which an exclusive property or privilege is being claimed are defined as follows:

1. An apparatus for attachment to a pipe cutter having a saddle portion, the apparatus comprising:
   a first member mountable to the saddle portion;
   a second member mountable to a pipe; and
   a pivoting joint to pivotally connect first member to second member;
   wherein the first member has a first end and a generally opposing second end;
   wherein the second member has a first end and a generally opposing second end;
   wherein the pivoting joint pivotally connects the first end of the first member to the first end of the second member;
   wherein the pivoting joint forms a vertex to allow the first member and the second member to act as rays of an angle created between said first member and said second member.

2. An apparatus for attachment to a pipe cutter having a saddle portion, the apparatus comprising:
   a first member mountable to the saddle portion;
   a second member mountable to a pipe;
   a pivoting joint to pivotally connect first member to second member;
   pipe mounting means to securely mount second member to said pipe; and
   at least one fastener to securely fasten first member to the saddle portion of the pipe cutter,
   wherein the first member has a first end and a generally opposing second end;
   wherein the second member has a first end and a generally opposing second end;
   wherein the pivoting joint pivotally connects the first end of the first member to the first end of the second member;
   wherein the pivoting joint forms a vertex to allow the first member and the second member to act as rays of an angle created between said first member and said second member and angle adjustment means for maintaining said angle.

3. The apparatus of claim 1 wherein when the first member is mountable to the saddle portion, and when the second member is mountable to the pipe, both the first member and the second member are configured to be positioned substantially between the pipe cutter and the pipe.

* * * * *